(12) United States Patent
Gant et al.

(10) Patent No.: US 11,313,726 B1
(45) Date of Patent: Apr. 26, 2022

(54) SAFE UV-C DOSIMETER

(71) Applicant: LUMENLABS LLC, Poway, CA (US)

(72) Inventors: Scott R. Gant, Poway, CA (US); Kevin C. Baxter, Tulsa, OK (US); Min Shi, Shanghai (CN)

(73) Assignee: Lumenlabs LLC, Poway, CA (US)

( * ) Notice: Subject to any disclaimer, the term of this patent is extended or adjusted under 35 U.S.C. 154(b) by 0 days.

(21) Appl. No.: 17/210,464

(22) Filed: Mar. 23, 2021

(51) Int. Cl.
| | |
|---|---|
| G01J 3/50 | (2006.01) |
| G01J 3/52 | (2006.01) |
| G01J 1/50 | (2006.01) |
| G01J 3/02 | (2006.01) |
| G01N 31/22 | (2006.01) |

(52) U.S. Cl.
CPC . G01J 3/50 (2013.01); G01J 1/50 (2013.01); G01J 3/0291 (2013.01); G01J 3/52 (2013.01); G01N 31/22 (2013.01)

(58) Field of Classification Search
CPC .... G01J 3/50; G01J 3/0291; G01J 3/52; G01J 1/50; G01N 31/22
See application file for complete search history.

(56) References Cited

U.S. PATENT DOCUMENTS

| | | | | |
|---|---|---|---|---|
| 5,107,123 | A | * | 4/1992 | Shi .......................... G01J 1/429 250/370.15 |
| 5,378,896 | A | * | 1/1995 | Knjaschewitsch ....... A61N 5/06 250/372 |
| 5,387,798 | A | * | 2/1995 | Funakoshi ............... C09K 9/02 250/474.1 |
| 6,398,970 | B1 | | 6/2002 | Justel et al. |
| 6,437,346 | B1 | * | 8/2002 | Goudjil ..................... G01J 1/50 250/372 |
| 6,793,817 | B2 | | 9/2004 | Kuennen et al. |

(Continued)

FOREIGN PATENT DOCUMENTS

| | | |
|---|---|---|
| CN | 206790749 U | 12/2017 |
| DE | 202020001197 U1 | 5/2000 |

(Continued)

OTHER PUBLICATIONS

Buonannoa et al., "Germicidal Efficacy and Mammalian Skin Safety of 222-nm UV Light"; Aug. 10, 2017.

*Primary Examiner* — David P Porta
*Assistant Examiner* — Jeremy S Valentiner
(74) *Attorney, Agent, or Firm* — Scott R. Zingerman; Gable Gotwals (57) ABSTRACT

A meter for measuring UV light having wavelengths, preferably between 205 nm and 237 nm. The meter includes at least one UV sensitive photo diode adapted for detecting the wavelengths of UV light between a lower end and an upper end; a first filter that blocks the UV light having wavelengths below 237 nm down to at least the lower end that the UV sensitive photo diode can detect; a second filter that blocks the UV light having wavelengths above 230 nm up to at least 205 nm; at least one amplifier for amplifying a signal from the UV sensitive photo diode; an analog to digital converter; a microprocessor; a battery in electrical communication with the microprocessor. The microprocessor preferably being in communication with the amplifier and the analog to digital converter. The microprocessor provides a result for the UV light that the UV sensitive photo diode is exposed to.

19 Claims, 10 Drawing Sheets

(56) References Cited

U.S. PATENT DOCUMENTS

| | | |
|---|---|---|
| 9,214,783 B2 | 12/2015 | Nomura et al. |
| 10,071,262 B2 | 9/2018 | Randers-Pehrson et al. |
| 10,780,189 B2 | 9/2020 | Randers-Pehrson et al. |
| 10,786,586 B2 | 9/2020 | Igarashi |
| 10,864,287 B2 | 12/2020 | Igarashi |
| 10,905,790 B1 | 2/2021 | Moore et al. |
| 10,960,094 B1 | 3/2021 | Ismail |
| 2006/0261291 A1 | 11/2006 | Gardner, III |
| 2006/0289796 A1* | 12/2006 | Havens ............... C08K 5/0041 250/492.2 |
| 2007/0255266 A1 | 11/2007 | Cumbie et al. |
| 2008/0224068 A1 | 9/2008 | Mii |
| 2009/0218512 A1 | 9/2009 | Ranta et al. |
| 2010/0007492 A1 | 1/2010 | Ressler et al. |
| 2010/0226029 A1 | 9/2010 | Funasaka |
| 2012/0313014 A1 | 12/2012 | Stibich et al. |
| 2012/0313532 A1 | 12/2012 | Stibich et al. |
| 2013/0250395 A1* | 9/2013 | Ichimura ................ G02F 1/11 359/287 |
| 2014/0092238 A1* | 4/2014 | Sandhu ............... G01J 1/1626 348/135 |
| 2014/0116961 A1* | 5/2014 | Bokermann ............. A61L 2/10 210/748.11 |
| 2016/0095193 A1 | 3/2016 | Mokhtari et al. |
| 2016/0230939 A1 | 8/2016 | Van Hout |
| 2017/0095583 A1 | 4/2017 | Stamminger et al. |
| 2017/0112953 A1 | 4/2017 | Dayton |
| 2017/0173195 A1 | 6/2017 | Stibich et al. |
| 2017/0216466 A1 | 8/2017 | Dujowich et al. |
| 2017/0356602 A1 | 12/2017 | Lin |
| 2018/0185533 A1 | 7/2018 | Lalicki et al. |
| 2018/0296711 A1 | 10/2018 | Brais et al. |
| 2019/0117802 A1 | 4/2019 | Hishinuma et al. |
| 2019/0160305 A1 | 5/2019 | Randers-Pehrson et al. |
| 2019/0171111 A1 | 6/2019 | Kimsey-Lin |
| 2019/0192708 A1 | 6/2019 | Igarashi |
| 2019/0328919 A1 | 10/2019 | Saad et al. |
| 2019/0342942 A1 | 11/2019 | Deros et al. |
| 2019/0360714 A1 | 11/2019 | Konrad et al. |
| 2019/0381336 A1 | 12/2019 | Randers-Pehrson et al. |
| 2019/0388706 A1 | 12/2019 | Randers-Pehrson et al. |
| 2020/0085984 A1* | 3/2020 | Randers-Pehrson ... A61B 90/80 |
| 2020/0179544 A1 | 6/2020 | Ufkes |
| 2020/0215214 A1 | 7/2020 | Rosen et al. |
| 2020/0215215 A1 | 7/2020 | Randers-Pehrson et al. |
| 2020/0267810 A1 | 8/2020 | Chemel et al. |
| 2020/0282086 A1 | 9/2020 | Silverman |
| 2020/0335228 A1 | 10/2020 | Yuan |
| 2020/0353112 A1 | 11/2020 | Randers-Pehrson et al. |
| 2020/0397936 A1 | 12/2020 | Deros et al. |
| 2021/0085810 A1 | 3/2021 | Barron et al. |
| 2021/0158974 A1 | 5/2021 | Seo et al. |
| 2021/0339183 A1 | 11/2021 | Hourani et al. |

FOREIGN PATENT DOCUMENTS

| | | | |
|---|---|---|---|
| JP | 2010118267 A | 5/2010 | |
| WO | WO-2014002591 A * | 1/2014 | ............ G01J 3/513 |

\* cited by examiner

Fig. 1

PRIOR ART

Fig. 2

PRIOR ART

SAFE UV-C DOSIMETER

FIELD OF THE INVENTION

The inventive system is in the field of Ultraviolet Light sterilization, specifically metering in the C band of ultraviolet wavelengths (UV-C). Such sterilization is presently used in hospital surgery rooms, burn wards, and similar areas that require a high degree of sterilization. The primary difference with these existing uses is the inventive system will be used to measure safety because of the presence of people and living tissues.

BACKGROUND OF THE INVENTION

The Corona Virus pandemic has changed many aspects of human life in every country. Even after the virus has been tamed by vaccines and antibodies the changes will remain. People are no longer comfortable being in close quarters with others in public settings. The contagion of regular flu and colds are now being treated with many of the same techniques as were used during the pandemic.

UV has 3 different bands, A, B, and C. UV-A is what we would generally associate with "black lights" and black light fluorescence. It is the longest wavelength of the 3 and has the least ability to kill viruses, bacteria and similar pathogens. Its wavelengths are from 315 nm to 400 nm.

UV-B has been the most preferred wavelength to be used by tanning salons. It is dangerous to use in excess around living things because it is both powerful enough to burn and has a long enough wavelength to penetrate cells, causing irreparable genetic damage. Its wavelengths are from 280 nm to 315 nm.

UV-C is recognized as one of the most effective wavelengths at killing the small pathogens because the shorter the wavelength the more powerful it is. Only recently was it discovered that some of the wavelengths in this band are long enough to kill pathogens and short enough to not be able to penetrate living cells. Living cells are many times larger than the tiny pathogens (including viruses) that we want to kill (or render inactive). UV-C is from 100 nm to 280 m, and the wavelengths that are generally being considered safe for exposure to human tissue are from 200 nm to 230 nm. UV-C does generate undesirable ozone, especially at wave lengths shorter than 200 nm.

Several studies have shown that hairless mice can be subjected to over 20 times the amount of 200 nm to 230 nm UV-C as is suggested for humans, 8 hours a day, with no adverse effect. These studies have been performed in Japan at University and in the US at Columbia University. These studies are extending in time for up to 6 months, still with no adverse effects.

There are several technologies that can generate UV light in the germicidal wavelengths, gas-discharge lamps have been around a long time and depending on the gases used can kill pathogens. Low pressure mercury generates 254 nm and has been the standard for decades, it is basically a fluorescent light without the phosphors on the inside that convert the UV to visible light. LEDs have recently been commercialized in the UV-A and UV-B spectrums, but they are very inefficient. There are a few in the longer wavelengths of the UV-C spectrum. A research project in Japan recently made an LED that was in low 200 nm's, the safer portion of the UV-C spectrum, but it was very inefficient and not practical for commercialization at this time.

Work places are protected by regulations, one of which is the internationally recognized Threshold Limit Values (TLV) which determines how much of particular UV wavelengths that workers can be exposed to in an 8 hour work day. This important protection is currently in a state of revision with the limits expected to being raised in the near future. Regardless of the timing of these changes the TLV limit it is important for workers safety and accurately measuring this level is equally important.

There are very few meters or technologies capable of measuring in the 222 nm range because it has only recently become a widely used wavelength. Most meters work at 254 nm as it has been the standard wavelength for decades. Some 222 nm fixtures have filters and are safe and some don't have filters and are unsafe because they transmit wavelengths other than just 222 nm. The filter material would ideally be very pure hafnium oxide deposited 2-3 um building a cutoff filter 234-400 nm with a depth of 0.0001. The few meters that do measure 222 nm are in the hundreds or thousands of dollars and are simply out of the budget for most users, besides not telling if there are harmful wavelengths present. This problem will continue once LEDs can make strong light at 200-234 nm.

There are portable electronic spectrometers available for the UV spectrum, but their prices start at $6,000 and up. No meter, dosimeter, or spectrometer presently show current TLV levels or TLV percentages present along with unsafe wavelengths present.

There are a plethora of companies that make UV dosimeter strips of paper. These strips are protected in opaque sleeves and once removed are exposed to a UV source, much like photographic films. They use colorimetric inks that change color when exposed to UV with a time/intensity factor, a dosimeter. The biggest problems are that the various wavelengths that are detected overlap too much, so it is impossible for these dosimeter strips to determine good exposure of safe wavelengths while in the simultaneous presence of bad wavelengths. These dosimeter strips also take a considerable amount of time to work, especially in the presence of dim but dangerous wavelengths.

What is needed is an affordable 200-234 nm (Safe UV-C) dosimeter that also indicates the percentage of TLV and the presence of unsafe wavelengths.

SUMMARY OF THE INVENTION

The inventive device provides a Safe UV-C (200 nm-234 nm) dosimeter that indicates the level of both safe and unsafe UV light. Ideally this dosimeter will be inexpensive and easy to use by laymen. Filters are the main reason that 222 nm based fixtures can be safe. 222 nm is generated by bulbs with the gasses krypton (Kr) and chloride (Cl) but there are several spikes of wavelengths other than 222 nm generated and these are what need to be filtered as they are unsafe. The inventive device will use one of these filters to block all unsafe wavelengths that strike the colorimetric paper or photo diode sensor to measure the safe levels. Because the photo diodes are small, the associated filters could also be very small, further lowering costs of the inventive device. The inventive device will also use a filter that blocks the safe and visible light from the second photodiode sensor or second area of colorimetric paper to measure only unsafe light levels. There are different types of paper strips, permanent and temporary. The permanent type is like what is currently being used in hotel rooms, the hotel sanitizes the room with UV and leaves the strip for the customer to see later. The temporary strips are similar to eyeglasses that change darkness when exposed to light, they darken quickly in bright light and then take about a minute to change back to clear once they are in darkness.

The combination of these same two filters in a quartz print frame and using existing UV dosimeter strips would be able to show dosing and the presence of unsafe wavelengths without using electronics. The unused colorimetric paper could be stored in a light tight drawer under the picture frame. The "safe" filter would cover one portion of the colorimetric material and the second "unsafe" filter would cover an adjacent portion of the colorimetric material. This would be a slow process in use but very inexpensive for single or occasional use, as the filters are subtractive and would add to the exposure time required by the colorimetric material. The electronically metered version would be for fast, constant use.

The inventive electronic device that uses photo diodes would read to light levels and ideally be connected by Bluetooth or other wireless means to a cell phone, tablet, or other such device (preferably portable but not necessarily) for display and logging functions. Without a display the sensor device could shrink to a very small size that would easily fit on a key chain FOB for constant access.

The present disclosure, therefore, includes a meter for measuring UV light having wavelengths, preferably between 205 nm and 237 nm. The meter includes at least one UV sensitive photo diode adapted for detecting the wavelengths of UV light between a lower end and an upper end; a first filter that blocks the UV light having wavelengths below 237 nm down to at least the lower end that the UV sensitive photo diode can detect; a second filter that blocks the UV light having wavelengths above 230 nm up to at least 205 nm; at least one amplifier for amplifying a signal from the UV sensitive photo diode; an analog to digital converter; a microprocessor; a battery in electrical communication with the microprocessor. The microprocessor preferably being in communication with the amplifier and the analog to digital converter. In an alternate embodiment, the meter may include two UV sensitive photo diodes The microprocessor provides a result for the UV light that the UV sensitive photo diode is exposed to. The result may be a numerical result. The result may be intensity provided in watts per cm$^2$ or it may be expressed in smaller units of watts. The meter may be adapted for providing results of the unsafe light outside of 205-234 nm. The result may be provided as a percentage of TLV levels. The meter may include an output device in communication with the microprocessor such that the result is provided to the output device. The output device may include a display and wherein the result is displayed on the display. The display could be a smartphone in communication (Bluetooth) with the microprocessor.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

DETAILED DESCRIPTION OF THE PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
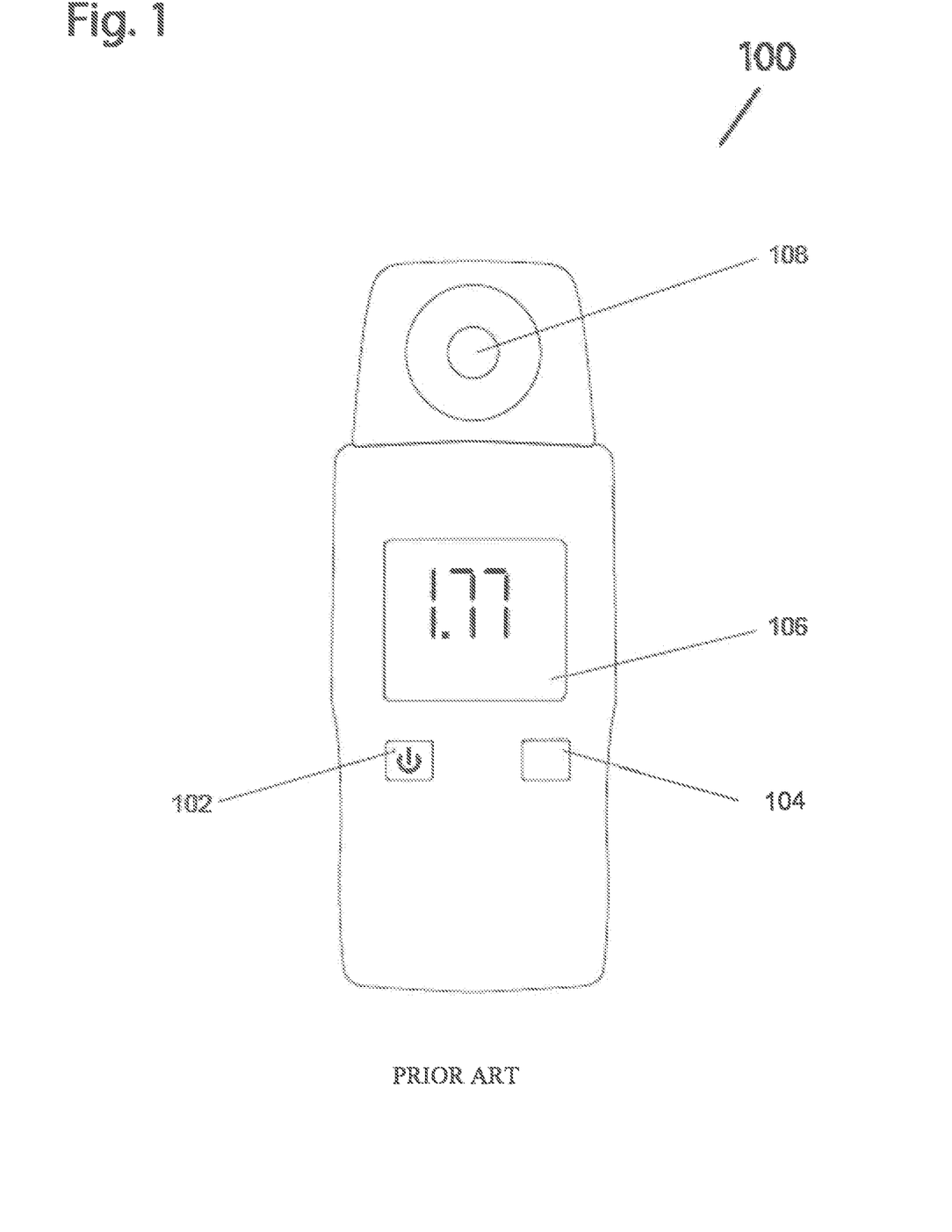
FIG. 1 UV light meter (prior art).

Referring now to the drawings, wherein like reference numerals indicate the same parts throughout the several views, a representative depiction of an (existing art) UV light meter 100 shown in FIG. 1. where meter 100 has several parts. The power switch 102, the measurement button 104, the display 106, sensor window 108. Not shown are the battery door or any internal parts. One turns on the power switch 102 to the UV meter 100 and then they can aim the sensor window 108 towards the ambient light source and then press the measurement button 104 whereupon the display 106 shows the light level, usually in milliwatts per square centimeter, or fractions thereof.

Figure 2:
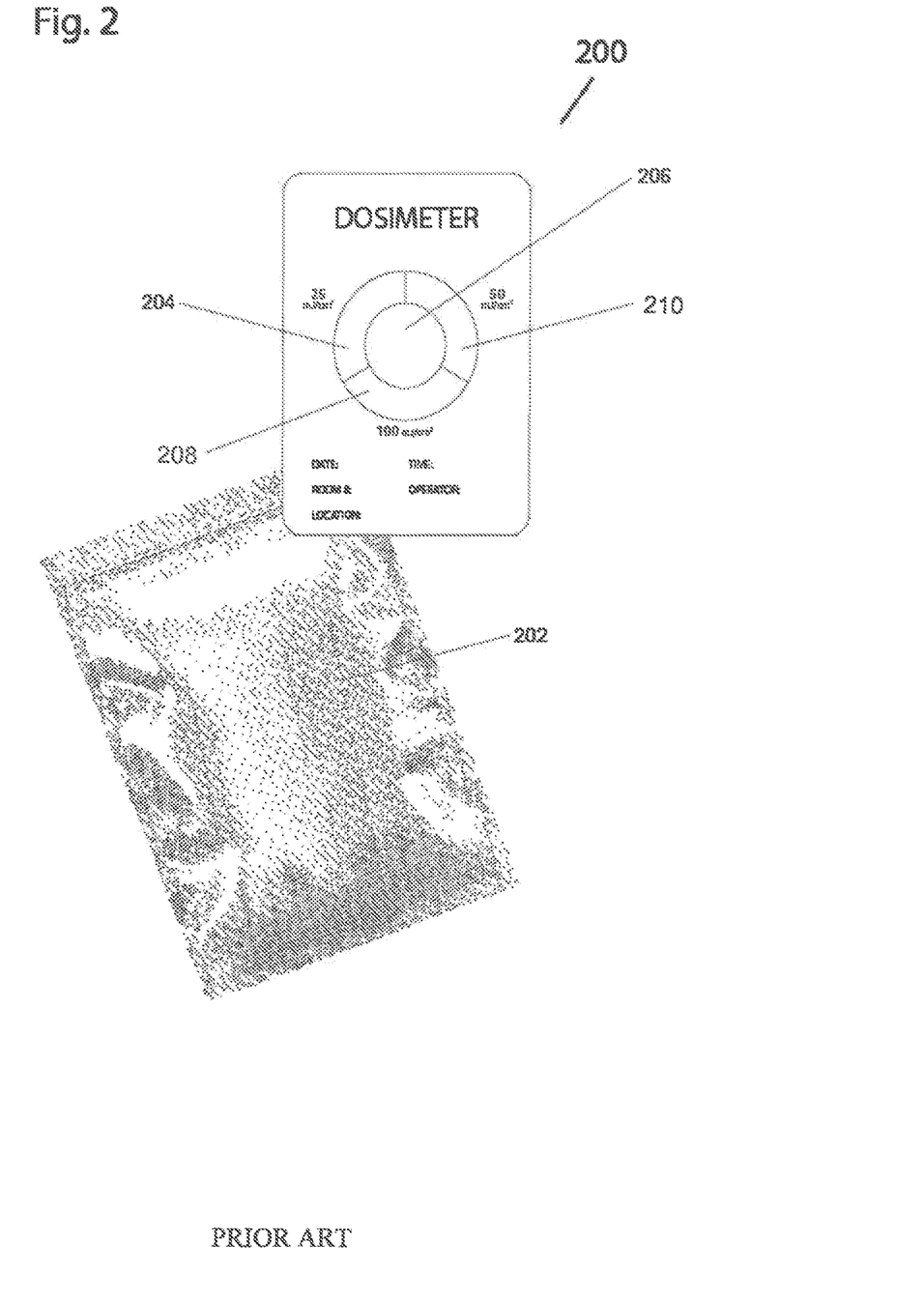
FIG. 2 UV colorimetric strips (prior art).

A different (existing art) technology is shown in FIGS. 204, 208 and 210 where a colorimetric paper strip 200 is out of its protected bag 202. The colorimetric portions are in the smaller internal confines and are usually adjacent to printed color keys 206. These keys 206 allow one to match the colorimetric portions 204, 208 and 210 to a key 206 color which indicates how much exposure occurred. The strip 200 comes sealed in the bag 202 and the strip 200 is only removed for exposure to the ambient light at the last moment. A set period of time or exposure elapses and the colorimetric portions 204, 208 and 210 either fully changes color indicating a full dose, or it changes slightly indicating less than a full dose.

Figure 3:
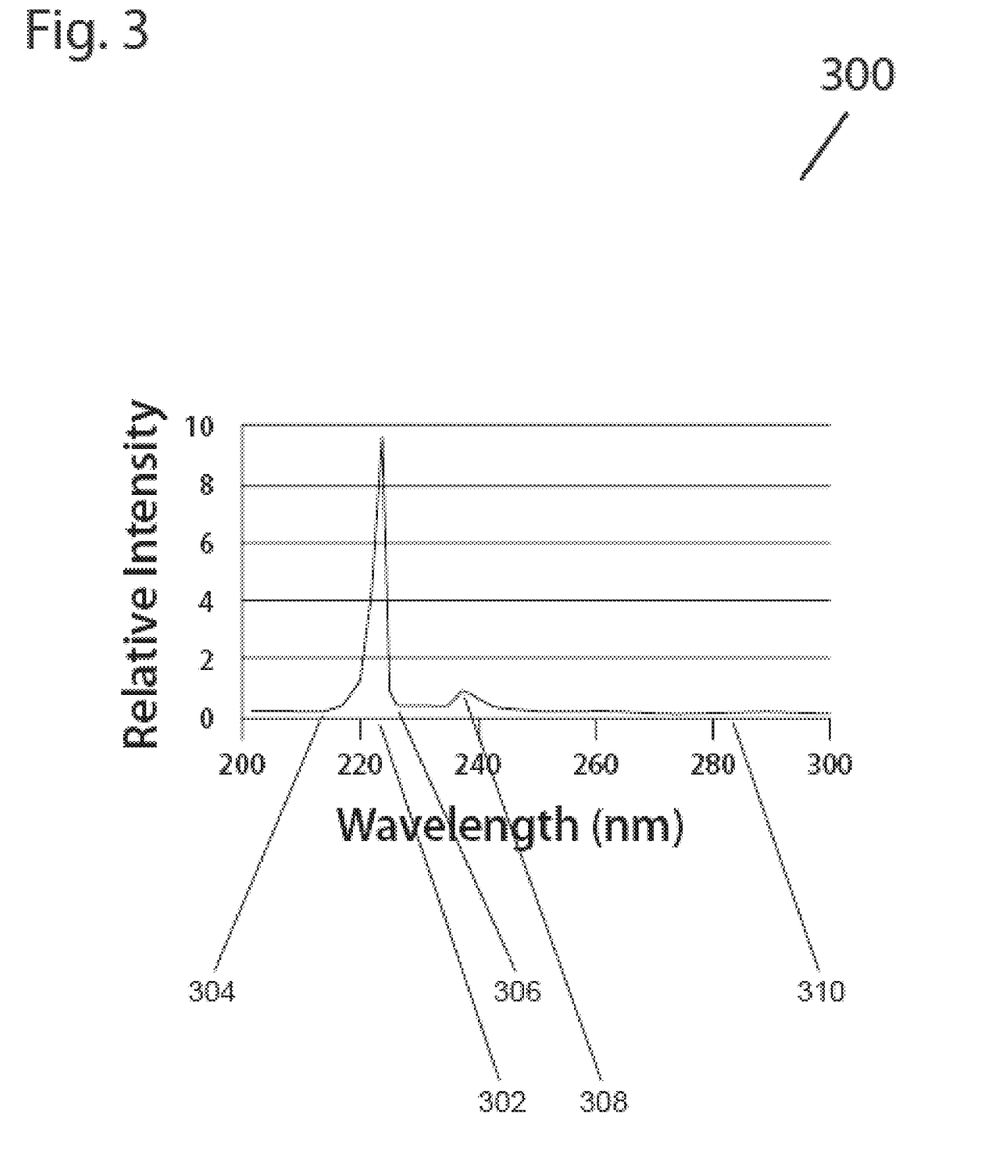
FIG. 3 Unfiltered 222 nm spectrum from a krypton (Kr) and chloride (Cl) bulb.

In FIG. 3 we see a chart 300 of unfiltered 222 nm that has been generated by a krypton and chloride bulb. Notice that the peak is at 222 nm 302 and the upper toe 304 on the shorter wavelength side is in the safe zone at about 210 nm and the lower toe 306 on the other side of the 222 nm peak is about 229 nm in the safe zone but there are other small peaks at 238 nm 308 and 290 nm 310 and they are dangerous to humans and living tissues.

Figure 4:
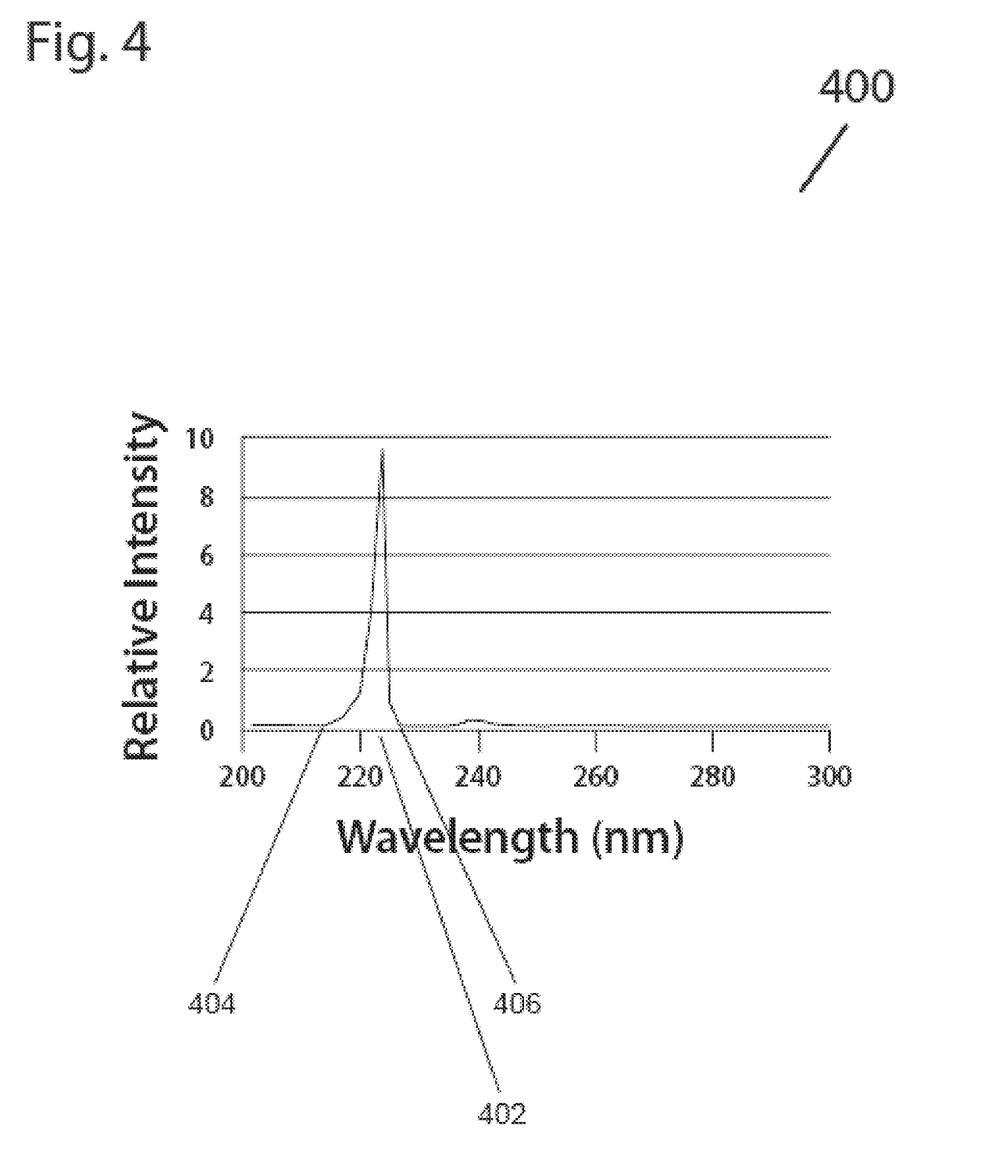
FIG. 4 Filtered 222 nm spectrum from a krypton (Kr) and chloride (Cl) bulb.

In FIG. 4 we see a chart 400 of filtered 222 nm that has been generated by a krypton and chloride bulb. Notice that the peak is at 222 nm 402 and the toe 404 on the shorter wavelength side is in the safe zone at about 210 nm and the toe 406 on the other side of the 222 nm peak is about 229 nm in the safe zone but there are no other small peaks that could be dangerous to humans or other living tissues.

Figure 5:
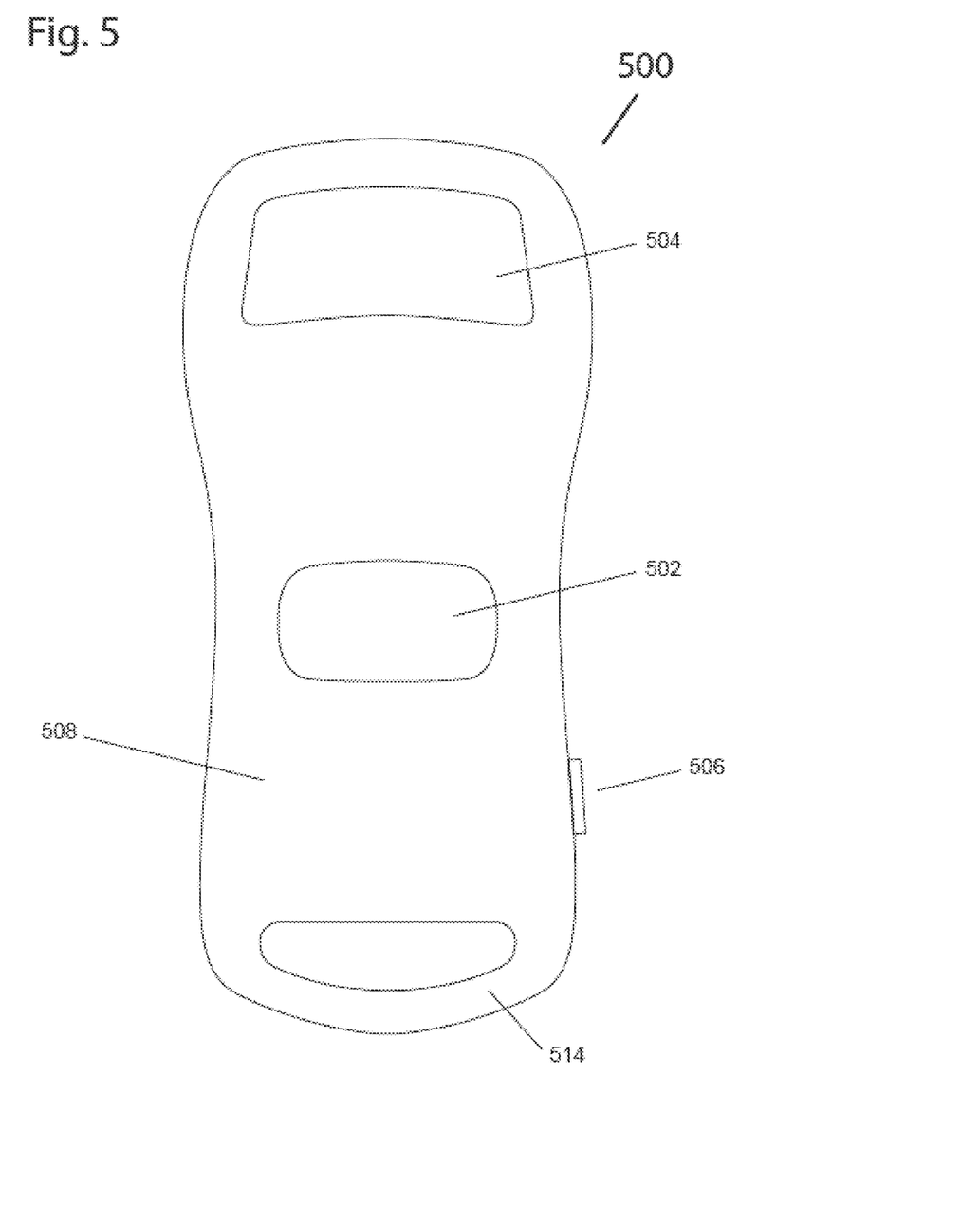
FIG. 5 Safe UV-C electronic dosimeter.

In FIG. 5 the inventive electronic Safe UV-C dosimeter 500 is shown. The dosimeter 500 ideally has only one button/switch 502 that is used to turn on the meter 500, make measured readings, and by holding it down for 5 or 10 seconds would cause the unit to try and pair it's Bluetooth to a nearby smartphone 512. The inventive meter 500 has a dual sensor window 504 made of quartz glass. The only other necessary external feature is a charging port 506 which would ideally be a USB-C type, the battery 510 is rechargeable permanently mounted inside the plastic case 508 of meter 500 and is unseen in this illustration. Also shown is a key ring mounting point 514.

Figure 6:
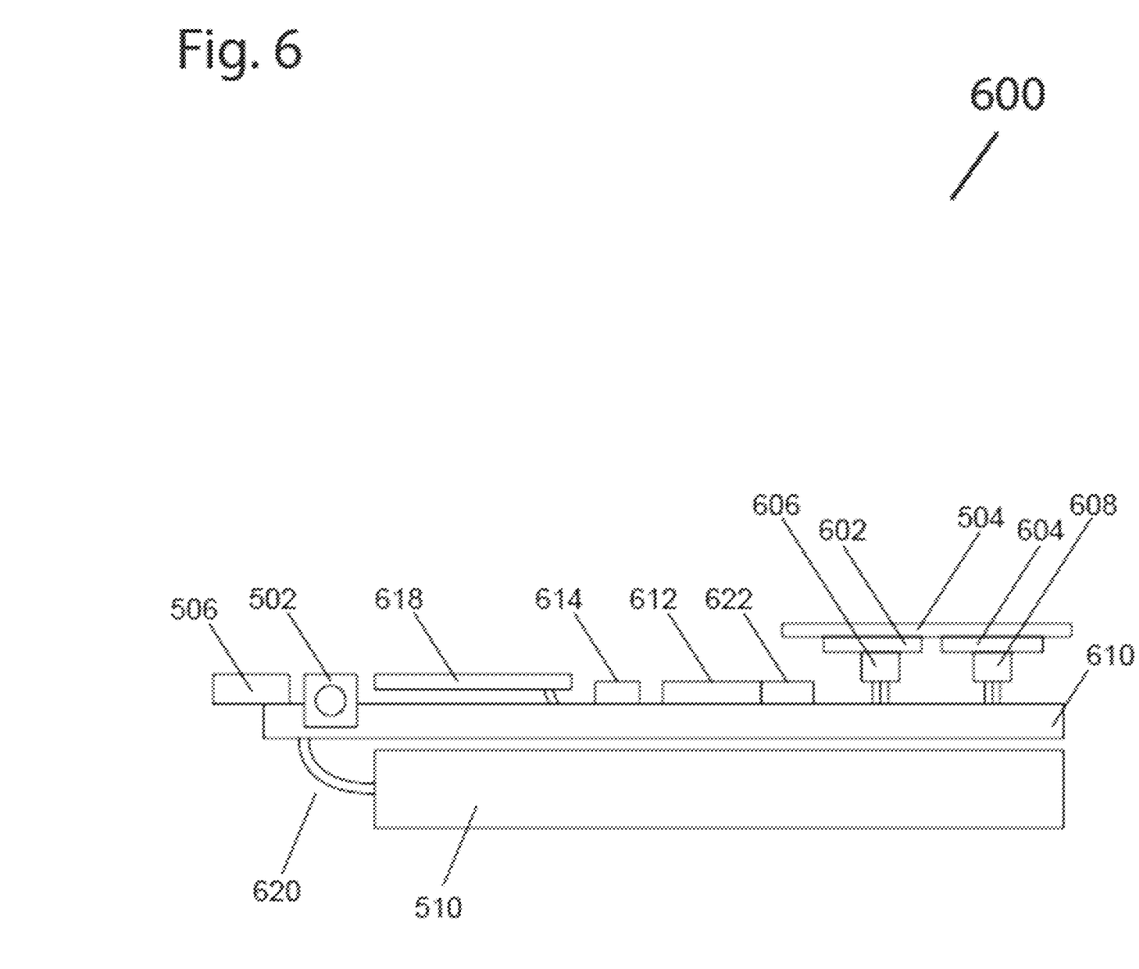
FIG. 6 Safe UV-C electronic dosimeter separated view.

In FIG. 6 components of the inventive dosimeter are shown as a side view but connected assembly 600. On top is the quartz sensor window 504, with safe filter 602 shown just below as well as unsafe filter 604 next to it. The safe filter 602 blocks wavelengths longer than lower toe 306, somewhere between 228 and 237 nm. The safe filter 602 should filter down to just above visible light or where the photo diode can no longer sense. The unsafe filter 604 blocks wavelengths shorter than the lower toe 306, somewhere between 228 and 237 nm. The unsafe filter should block all light from there up to beyond the upper toe 304, somewhere just shorter than 205 nm.

Below safe filter 602 is safe photo diode 606 and next to it is unsafe photo diode 608. Both Safe photo diode 606 and unsafe photo diode 608 are mounted on a printed circuit board (PCB) 610, along with the microprocessor 612 which has a two-channel internal 12 bit analog to digital converter (ADC) 622. An ideal UV photo diode to use would be the SD008-2151-112 from Advanced Photonix of Camarillo Calif. The button/switch 502 which is a momentary switch is also mounted on the PCB 610 but comes to the side in order that the light path 616 not be blocked by the user's fingers. The charging port 506 is also mounted on the PCB 610 as is the battery charging circuit 614. On the upper side of the PCB 610 is the Bluetooth module 618. Below the PCB 610, connected by wires 620 is the battery 510.

The lack of a display allows for a lower cost and a smaller size for the inventive 222 nm dosimeter 500. The safe photo diode 606 is mounted against the safe filter 602 such that no other light is allowed into the safe diode 606 other than what comes through the filter 602 first. The safe photo diode 606 also has a clear view through the quartz cover window 504. The unsafe photo diode 608 is positioned so that is against the unsafe filter 604 and receives no light that hasn't first passed through the unsafe filter 604. The unsafe photo diode 608 has a clear view through the quartz cover window 504.

Figure 7:
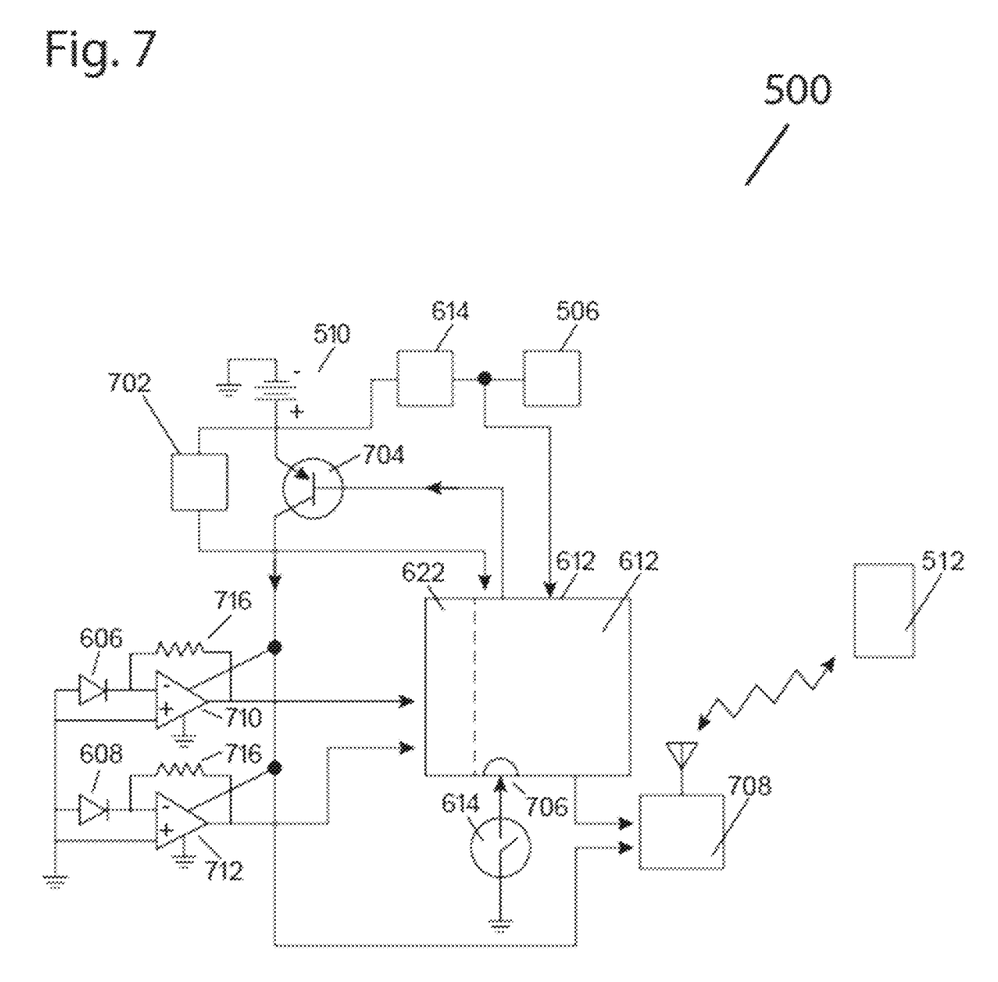
FIG. 7 Safe UV-C electronic dosimeter schematic and operation with a smart phone and calibration computer.

In FIG. 7 shows a schematic of the inventive electronic Safe UV-C dosimeter 500. The battery 510 feeds a low quiescent current voltage regulator 702 that then goes to the microprocessor 612. The microprocessor 612 controls a switch 704 that powers both the Bluetooth wireless module 618 and the op-amps 710, 712 and photo diodes 606, 608. The push button 614 goes to an interrupt pin 706 on the microprocessor 612 such that the microprocessor 612 wakes up when the button/switch 502 is pushed. The microprocessor 612 then powers the wireless 618 and sensors 606, 608 and op-amps 710, 712 and determines if it is going to read and report UV light levels or is it going to pair its Bluetooth wireless module 618 with a smart phone 512. The resistors 716 of the op-amps 710, 712 are sized to allow the correct amount of gain in the op-amps 710, 712 so that the signal to the ADC 622 is ideal for a full 12 bits of resolution over the desired brightness range of light detected. The microprocessor 612 could be separate, or the same microprocessor 612 used in the Bluetooth wireless module 618.

When the battery port 506 is being charged 614 it is being monitored by a pin on the microprocessor 612, and during charging the dosimeter 500 is using the Bluetooth wireless module 618 to search and talk to a calibration computer 714. If the calibration computer 714 is found the computer 714 produces a known brightness of light and then tells the dosimeter 500. The dosimeter 500 reads the brightness and stores it in EEPROM. The calibration computer 714 makes the next brighter step of light and the process is repeated until all the light levels have been read and recorded in EEPROM for both safe and unsafe light. The light levels are communicated and stored in the format of microwatts per cm2.

When the button/switch 502 is pushed the processor 612 wakes up the dosimeter 500 connects to its paired smartphone 512 and then reads the safe 606 and unsafe photodiodes 608 and transmits the Bluetooth wireless module 618 to the smart phone 512 in microwatts per cm2. The smart phone 512 then displays the light level of safe light to microwatts per cm2, and then also calculates the percentage of TLV and displays that as a percentage. Lastly the smart phone 512 takes the unsafe light level and determines which display should be used, "safe", "unsafe", or "very unsafe". "Safe" would be displayed in green. Both "unsafe" and "very unsafe" would be displayed in red. After completing the communication with the smartphone 512, the dosimeter 500 would go into low power sleep, un-powering the photo diodes 606, 608, op-amps 710, 712, and Bluetooth wireless modules portions 618.

Figure 8:
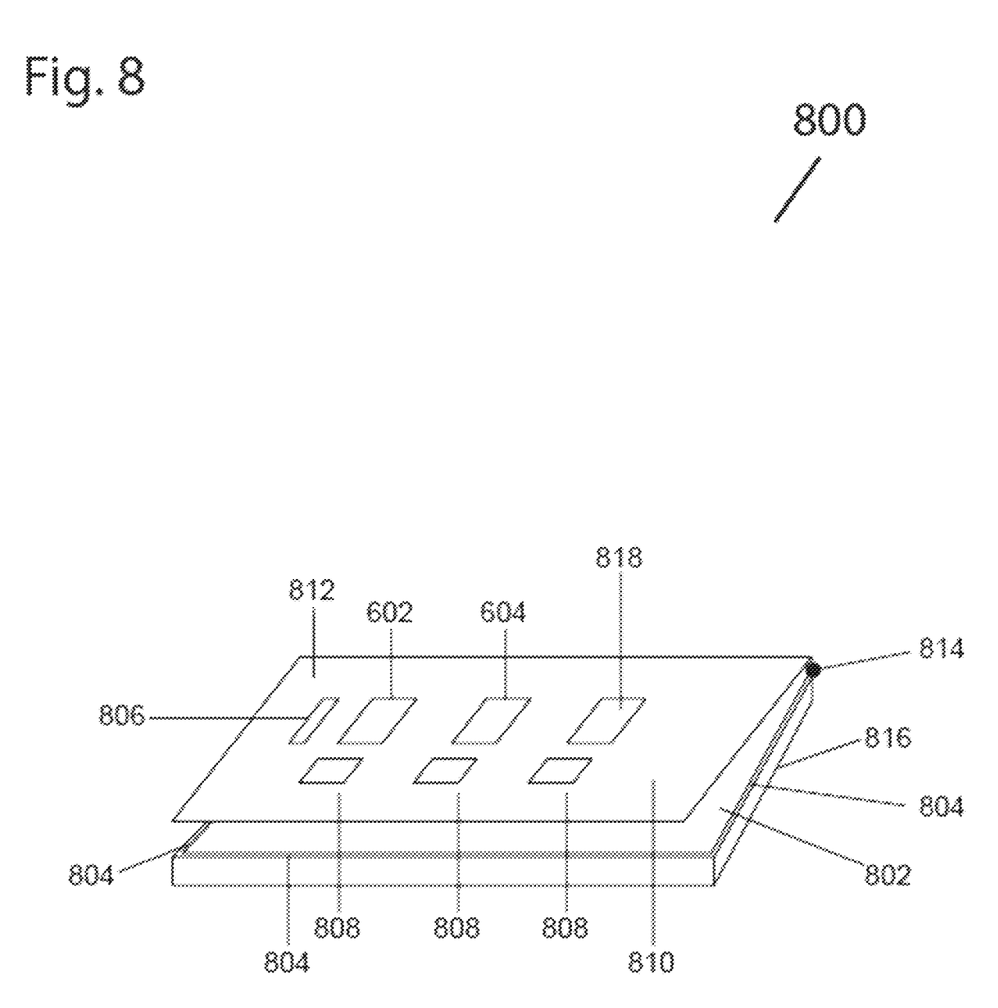
FIG. 8 Inventive print frame open with colorimetric paper.

In FIG. 8 shows an open inventive print frame dosimeter 800 that has a safe filter 602 and an unsafe filter 604 on the bottom side of a top sheet of quartz glass 812 that is hinged 814 to base plate 816. The best size for the inventive dosimeter is about the size of a credit card so that it can be carried in one's pocket. Ideally the filters 602, 604 are permanently attached to quartz glass 812. Also shown is a sheet of existing colorimetric coated paper 802 and alignment ridges 804 to precisely position the colorimetric coated paper 802 in the print frame dosimeter 800. The colorimetric coated paper 802 has printed areas 806, colorimetric coated areas 808, and blank areas 810. The colorimetric coatings can detect UV down to the UV-A band and up to 200 nm. UV-A could be detected separately by a different colorimetric material 818 in a different area of the paper that is sensitive only to UV-A and this colorimetric material is available from Rochie Tech.

Figure 9:
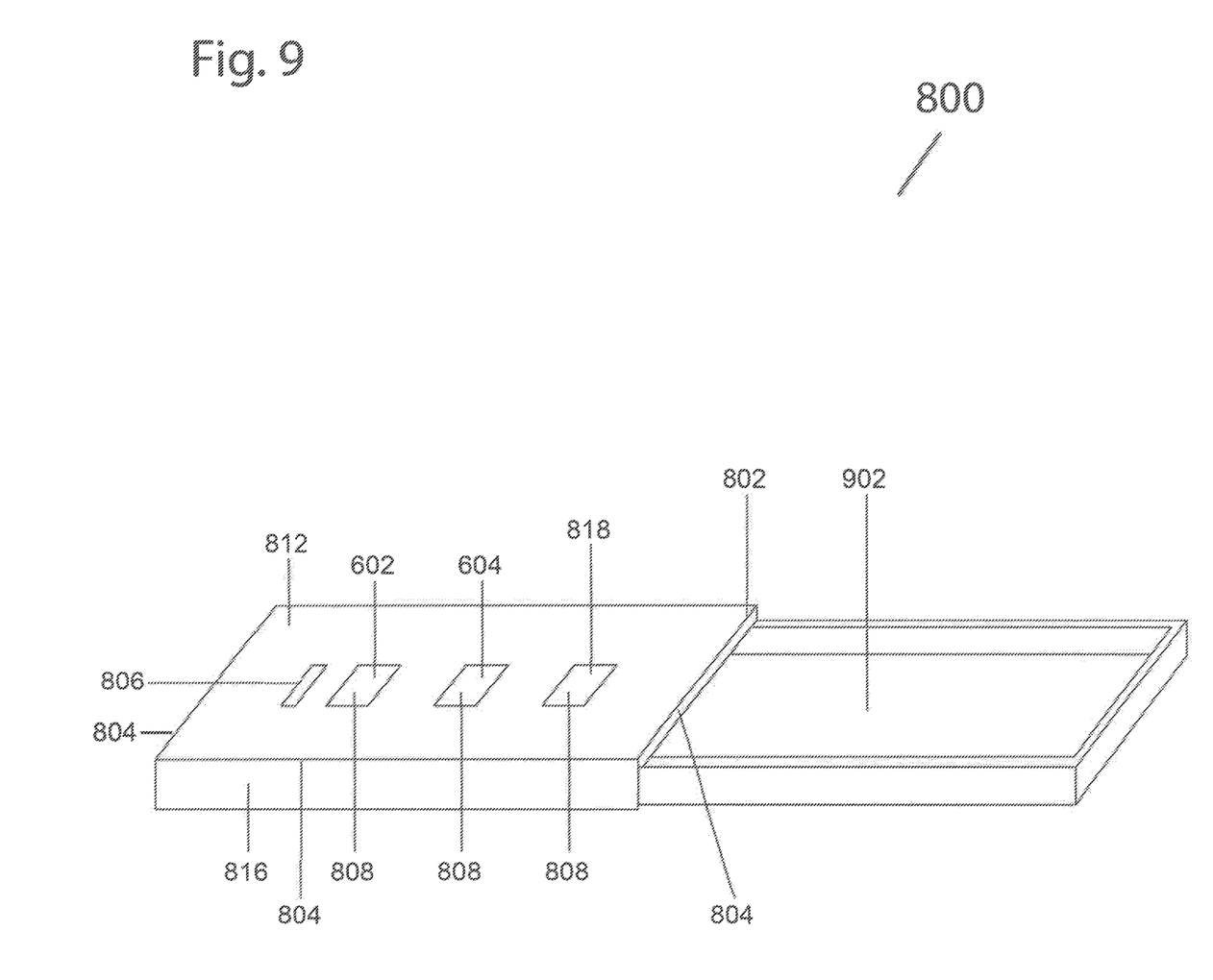
FIG. 9 Inventive print frame with colorimetric paper stored in a drawer.

FIG. 9 shows base plate 816 of the inventive print frame dosimeter 800 with the drawer 902 in an opened position with respect to base plate 816. Sandwiched between the colorimetric coated paper 802 and quartz glass 812 are a safe filter 602 and an unsafe filter 604, side by side. Ideally the location of the filters 602, 604 is aligned with the printed area 806 on the colorimetric coated paper 802. This happens once the colorimetric coated paper 802 fits over alignment ridges 804. Then the colorimetric coated paper 802, its printed area 806, the colorimetric coating areas 808, and the filters 602, 604 are all in place to take an exposure through the two filters 602, 604 onto the colorimetric coated paper 802 making a dosimeter 800 that measures and shows safe light and shows the presence of unsafe light.

Figure 10:
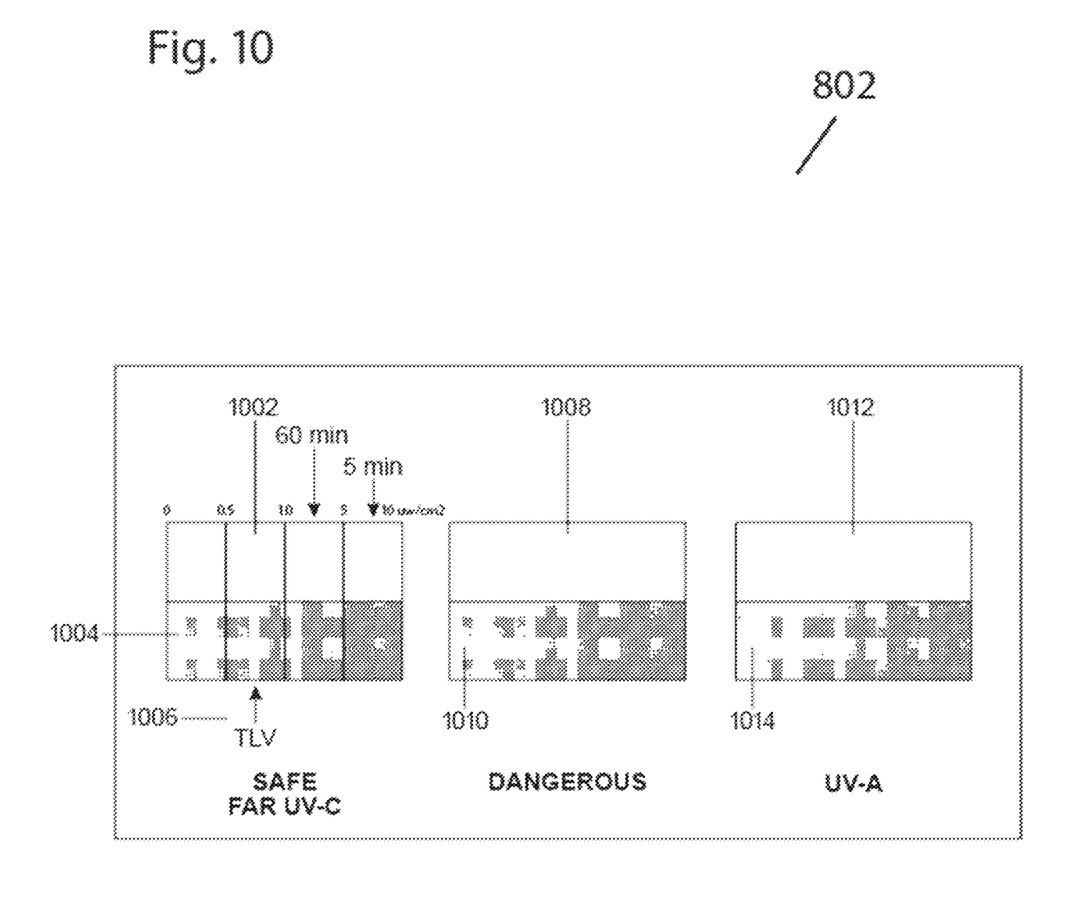
FIG. 10 Safe UV-C dosimeter paper strip

In FIG. 10 we see the colorimetric coated paper 802 as it would be used in the inventive filtering device 800 (of FIGS. 8 and 9). There are 3 distinct areas, the safe dosimeter indicator 1002 is printed in a graduated stripe and its corresponding reference key 1004 which is printed at the same darkness and color as would indicate a particular exposure along the stripe. This is a gradual scale from light (low exposure) to a dark indication (heavy exposure). This portion of the dosimeter 1002 would be sensitive to UV-C and would show maximum allowable exposure at the TLV point 1006. The second distinct area is the unsafe dosimeter indicator 1008 which is printed in a graduated stripe and its corresponding reference key 1010. The key 1010 shows a light indication equals a low exposure to dangerous light, a medium darkness would indicate an unsafe exposure, and a dark indication along the stripe would show a very unsafe exposure to dangerous light. This portion of the dosimeter 1008 would be sensitive to UV light in general. Lastly the third distinct area would be an optional dosimeter 1012 that detects UV-A exposure. The dosimeter area 1012 which is printed as a stripe and is directly adjacent to the reference key 1014 where the key shows a light color for a mild exposure and is dark in the portion with a heavy exposure to UV-A light along the stripe. This dosimeter area 1012 would not be covered by any UV filters and would be a different type of colorimetric material than the previous in that it only detects UV-A.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the scope and spirit of this invention as defined by the appended claims.

What is claimed is:

1. A meter for measuring UV light wavelengths, comprising:
   at least one UV sensitive photo diode adapted for detecting the wavelengths of UV light between a longer wavelength and shorter wavelength;
   a first filter that blocks the UV light having wavelengths longer than 237 nm to at least said longer wavelength that said at least one UV sensitive photo diode can detect;

a second filter that blocks the UV light having wavelengths shorter than 230 nm to at least 205 nm;

at least one amplifier for amplifying a signal from said at least one UV sensitive photo diode;

an analog to digital converter;

a microprocessor;

a battery in electrical communication with said microprocessor;

said microprocessor being in communication with said amplifier and said analog to digital converter;

wherein said microprocessor provides a result for the UV light said at least one UV sensitive photo diode is exposed to.

2. The meter for measuring UV light of claim 1 wherein said result is intensity provided in watts per $cm^2$.

3. The meter for measuring UV light of claim 2 wherein said watts can be expressed in smaller units of watts.

4. The meter for measuring UV light of claim 1 is adapted for providing results of wavelengths of light outside of 205-234 nm.

5. The meter for measuring UV light of claim 1 wherein said result is provided as a percentage of Threshold Limit Value (TLV).

6. The meter for measuring UV light of claim 1 adapted for providing said result using a smartphone.

7. The meter for measuring UV light of claim 1 adapted to use time to provide microjoules of exposure.

8. The meter for measuring UV light of claim 1 wherein said microprocessor calculates time to maximum Threshold Limit Value exposure.

9. The meter for measuring UV light of claim 1 including an output device in communication with said microprocessor such that said result is provided to said output device.

10. The meter for measuring UV light of claim 9 wherein said output device includes a display and wherein said result is displayed on said display.

11. The meter for measuring UV light of claim 10 wherein said result is a numerical result.

12. The meter for measuring UV light of claim 1 comprising two UV sensitive photo diodes.

13. A meter for measuring 205 nm-237 nm UV light comprising:
   a UV sensitive colorimetric coated paper;
   a first hafnium oxide filter that blocks wavelengths of light longer than 237 nm to the A band of UV light;
   a second hafnium oxide filter that blocks wavelengths of light shorter than 230 nm to 205 nm, and,
   a quartz glass.

14. The meter for measuring 205 nm-237 nm UV light of claim 13 wherein said UV sensitive colorimetric coated paper indicate unsafe lighting environments.

15. The meter for measuring 205 nm-237 nm UV light of claim 13 wherein said quartz glass is connected to a base plate.

16. The meter for measuring 205 nm-237 nm UV light of claim 15 wherein said base plate has a light-proof drawer.

17. The meter for measuring 205 nm-237 nm UV light of claim 13 wherein said UV sensitive colorimetric coated paper indicate a complete dose of 205-237 nm exposure.

18. The meter for measuring 205 nm-237 nm UV light of claim 13 further including a second UV sensitive colorimetric coating that is sensitive to UV-A.

19. A meter for measuring 205 nm-237 nm UV light comprising:
   a UV sensitive colorimetric coated paper;
   a first hafnium oxide filter that blocks wavelengths of light longer than 237 nm to the A band of UV light;
   a second hafnium oxide filter that blocks wavelengths of light shorter than 230 nm to 205 nm, and,
   a quartz glass cover plate connected to a base plate;
   said base plate having a light-proof drawer.

* * * * *